(No Model.) 3 Sheets—Sheet 1.
B. F. BUTLER.
GRAIN SHOCKING MACHINE.

No. 355,378. Patented Jan. 4, 1887.

Witnesses:
P. R. Richards.
Thos. W. King.

Inventor:
Benj. F. Butler,
By W. B. Richards,
Atty.

(No Model.) 3 Sheets—Sheet 2.

B. F. BUTLER.
GRAIN SHOCKING MACHINE.

No. 355,378. Patented Jan. 4, 1887.

Witnesses:
P. R. Richards.
Thos. W. King.

Inventor:
Benj. F. Butler,
By W. B. Richards,
Atty.

(No Model.) 3 Sheets—Sheet 3.
B. F. BUTLER.
GRAIN SHOCKING MACHINE.
No. 355,378. Patented Jan. 4, 1887.
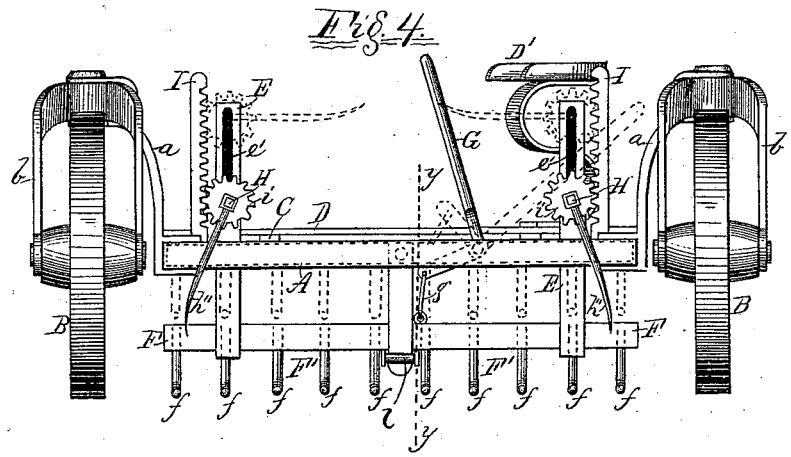
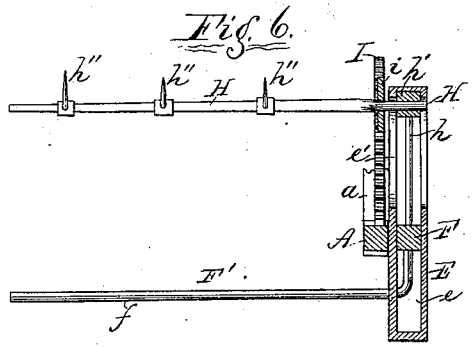
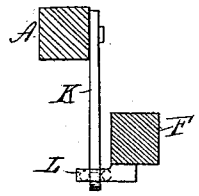
Witnesses:
P. R. Richards.
Thos. W. King.
Inventor:
Benj. F. Butler,
By W. B. Richards,
Atty.

United States Patent Office.

BENJAMIN F. BUTLER, OF WOODHULL, ILLINOIS.

GRAIN-SHOCKING MACHINE.

SPECIFICATION forming part of Letters Patent No. 355,378, dated January 4, 1887.

Application filed April 11, 1884. Serial No. 127,477. (No model.)

*To all whom it may concern:*

Be it known that I, BENJAMIN F. BUTLER, a citizen of the United States, residing at Woodhull, in the county of Henry and State of Illinois, have invented certain new and useful Improvements in Grain-Shocking Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of machines for shocking grain in which the sheaves are received upon a carriage or platform that travels with the harvester, on which platform said sheaves are first formed into shocks and then dropped to the ground.

In this class of shocking-machines as heretofore constructed that part of the platform on which the shock of grain was formed has been arranged to tilt or swing downwardly for the purpose of dropping the shock to the ground, which tilting movement must necessarily disarrange the shocks more or less; and the main object of my invention is to overcome this difficulty.

The invention therefore consists of constructions and combinations, all as will hereinafter be described in the specification, and pointed out in the claims, whereby the objects sought for are obtained.

In the accompanying drawings I have shown one method of carrying out my invention, in which—

Figure 1:
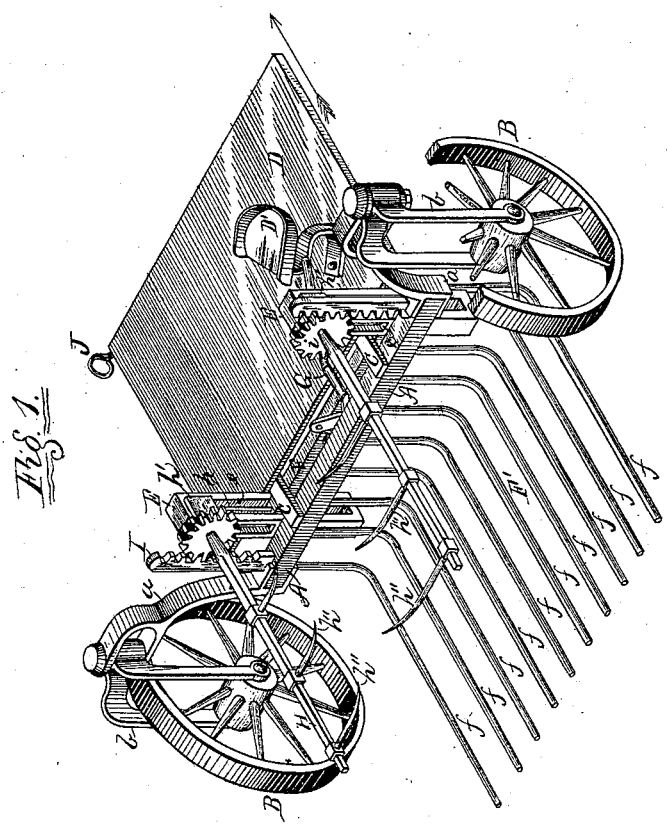
Figure 2:
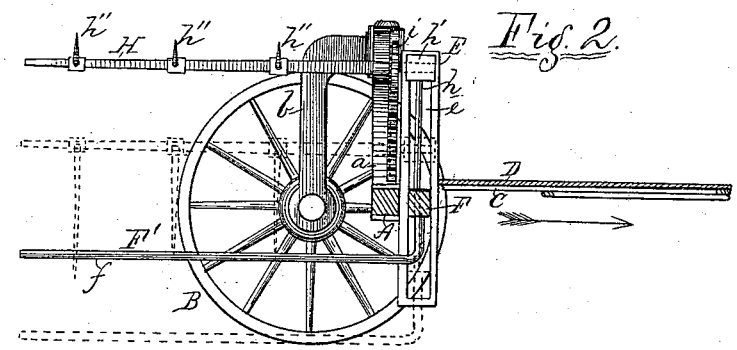
Figure 3:
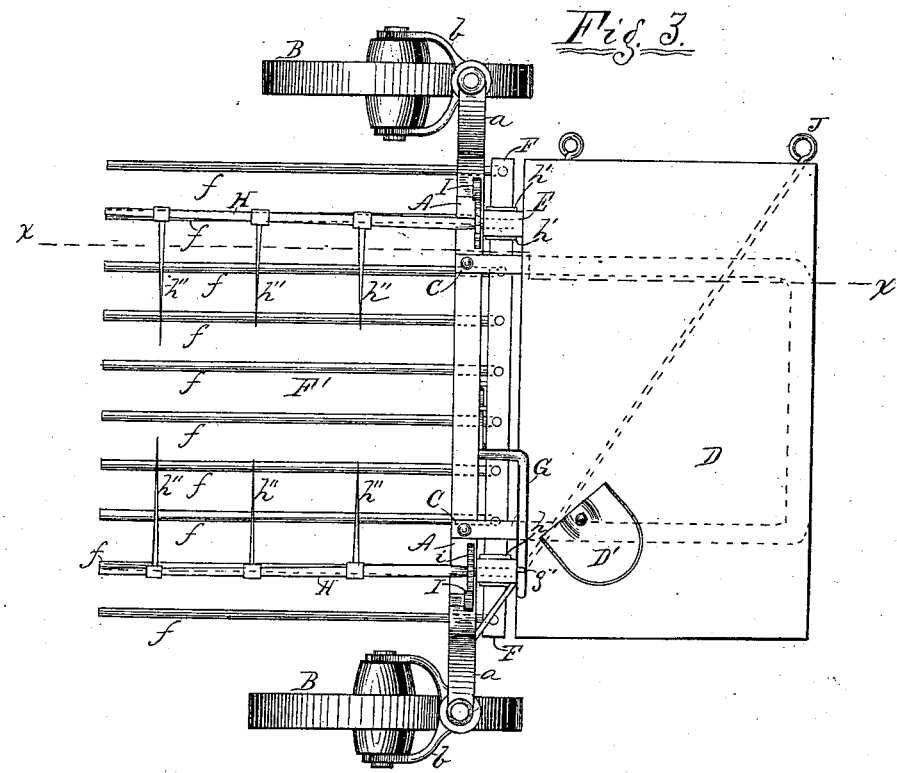

Figure 1 is a perspective, partly broken away to show the working parts; Fig. 2, a sectional elevation in the line $x\,x$ in Fig. 3; Fig. 3, a top plan; Fig. 4, a rear elevation; Figs. 5, 6, and 7, details hereinafter referred to.

Referring to the drawings by letters, A represents what may be termed an "axle," consisting of a bar with an upwardly-projecting bracket, $a$, at each end.

B B are the supporting-wheels, each journaled at the lower end of a swivel, $b$, which swivel is journaled at its upper end in a bracket, $a$, whereby the wheels B become caster-wheels.

The axle A may be formed in any desired manner, as its particular construction does not form any essential feature in my invention.

Projecting forwardly from the axle is a frame-bar, C, which supports a platform, D, on which is mounted an operator's seat, D'. Near each end of the axle A a block, E, is secured, each of which blocks E has a vertical slot, $e$, in which a head-bar, F, is held, so that it may slide up and down, as hereinafter described. From the head-bar F rods $f$ extend downward and then rearward to form the platform F', on which the sheaves are assembled to form shocks. The head F and platform F' are raised and lowered by means of an elbow-lever, G, which is pivoted at its bend to the axle A, and connected by a link, $g$, to the head F. When the lever G is thrown over to sustain the platform F' in its elevated position, it (the lever G) is held by a spring-catch, $g'$, (see Figs. 3 and 4,) and when the lever is turned to lower the platform F' the weight of said platform will keep it down to the ground.

From each end of the head-bar F a rod or bar, $h$, extends upwardly and connects with a head, $h'$, in which is journaled one end of a guard-rod, H. Each guard-rod H extends rearward, as shown, through a vertical slot, $e'$, in its adjacent block E, whereby the rods H may be moved upwardly and downwardly by and simultaneously with the platform F' and head F. Each rod H is provided with curved spurs $h''$, which may be formed of a single spur, as shown at Fig. 6, or a double or forked spur, as shown at Fig. 5. Each guard-rod H carries a pinion, $i$, which gears with a vertical rack-bar, I, which projects upwardly from the axle A, by means of which, when the head F is raised, as shown by full lines at Figs. 1, 2, and 3 and dotted lines at Fig. 4, the spurs $h''$ on each rod H will project inwardly or toward the other rod H, and as the platform F' and head F are lowered to the position shown by full lines at Fig. 4 and dotted lines at Fig. 2 the rack-bars I will rotate the pinions $i$ and rods H, and thus turn the spurs downwardly and rearwardly into the positions shown most plainly by full lines at Fig. 4.

To further prevent any swinging or tilting movement of the platform F' as it is lowered and raised, I project a bar, K, which is fixed to the axle A, downwardly through a slotted plate, L, which is fixed to the head F, and is provided with anti-friction rollers l. (See Fig. 7, which is a sectional elevation of this device in the line y y in Fig. 4.)

In operation the machine may be attached to any ordinary grain-binding machine, either by the ring J or otherwise, and in such position as to move in the direction of the arrow at Figs. 1 and 2, and to receive the bundles or sheaves of grain on the platform D as they are discharged from the binder; or the machine may be drawn alongside of the binder by draft-animals attached to the shocking-machine itself. The platform F' being at its elevated position, the operator, either standing on the platform B or seated on the seat D', receives the shocks as they are delivered to him and forms the shock on the platform F'. The first or outer sheaves in forming the shock are forced on to the spurs h'', which sustain them until the shock is formed and the cap-sheaves placed thereon, when the operator, by turning the lever G, lowers the platform F' bodily to the ground, as hereinbefore described, without any tilting or swinging movement thereof, and with the rods of which it is composed in all parts of its downward movement retained in planes parallel with its position before lowering it. As the platform F' is lowered the rods H will be partially rotated, as hereinbefore described, and thus withdraw the spurs h'' from the shock before it reaches the ground, so that the forward movement of the machine will draw the rods forming the platform F' from beneath the shock and leave it standing in an upright position and in good form.

Other means than those I have herein shown and described may be used for raising and lowering the platform on which the shock is formed, and hence I do not limit my claims for this main feature of my invention to any particular method of raising and lowering said platform. It will be evident, also, that wheels which are not swiveled to the axle may be used instead of the caster-wheels; hence I do not limit my claims to the use of caster-wheels, except where these wheels are recited specifically in such claim; but

What I claim as new, and desire to secure by Letters Patent, is—

1. In a grain-shocker, in combination with the supporting frame or axle A and the rising and falling platform F', the rods H, provided with spurs and having means, substantially as described, for rotating them as the platform F' is raised and lowered, substantially as and for the purpose specified.

2. In combination, the axle or frame A, supporting-wheels, rising and falling platform F', head F, slotted blocks E, rack-bars I, rods H, pinions i, and lever G, substantially as and for the purpose specified.

3. In a grain-shocking machine, in combination with the axle or main frame A and slotted heads E, the vertically-moving platform F' and head F, substantially as and for the purpose specified.

4. In a grain-shocking machine, in combination, a rising and falling platform on which the shocks are formed, and guards H, adapted to rise and fall simultaneously with said platform, and means for rotating said guards H, substantially as and for the purpose specified.

5. In a grain-shocking machine, in combination, a rising and falling platform on which the shocks are formed, and guards H, adapted to rise and fall simultaneously with said platform, substantially as and for the purpose specified.

6. In combination, the axle or transverse bar A, rising and falling platform F', and head F, the bar K, and slotted plate L, provided with anti-friction rollers l, substantially as and for the purpose specified.

7. In a grain-shocking machine, in combination, the platforms D and F', head F, axle A, and caster-wheels B, substantially as and for the purpose specified.

In testimony whereof I affix my signature in presence of two witnesses.

BENJAMIN F. BUTLER.

Witnesses:
A. E. PERRIN,
H. M. RICHARDS.